United States Patent [19]
Wieserman et al.

[11] Patent Number: 4,786,628
[45] Date of Patent: Nov. 22, 1988

[54] CHROMATOGRAPHIC PACKINGS COMPRISING METAL OXIDE/HYDROXIDE REACTED WITH PHOSPHONIC ACID

[75] Inventors: Larry F. Wieserman, Apollo; John W. Novak, Jr., New Kensington; Christine M. Conroy; Karl Wefers, both of Apollo, all of Pa.

[73] Assignee: Aluminum Company of America, Pittsburgh, Pa.

[21] Appl. No.: 23,429

[22] Filed: Mar. 9, 1987

[51] Int. Cl.$^4$ ............................................. B01J 20/22
[52] U.S. Cl. .................................................. 502/401
[58] Field of Search ............... 502/162, 208, 214, 355, 502/401, 407, 415, 425; 55/67; 210/198.2, 198.3; 427/220

[56] References Cited

U.S. PATENT DOCUMENTS

4,202,798  5/1980  Johnson et al. ................. 502/213 X
4,308,079 12/1981  Venables et al. ............... 428/414 X
4,506,628  3/1985  Stockel ................................... 119/1

Primary Examiner—W. J. Shine
Attorney, Agent, or Firm—Andrew Alexander; John P. Taylor

[57] ABSTRACT

A chromatographic packing material is disclosed comprising a metal oxide/hydroxide particle having chemically bonded to reactive sites on a surface thereof, a monolayer of one or more phosphonic acids. The bond to the metal oxide/hydroxide surface is formed by reaction of the phosphorous-containing group of the phosphonic acid with the metal oxide/hydroxide surface, so that the carbon-containing or non-polar group of the phosphonic acid is oriented away from the metal oxide/hydroxide surface.

23 Claims, 8 Drawing Sheets

Weight Percent of Phosphorus
Adsorbed onto Bayerite and Gamma Alumina
as a Function of Phenylphosphonic Acid Concentration

FIG. 2

Weight Percent of Phosphorus Adsorbed onto Bayerite and Gamma Alumina as a Function of Aging Time

Comparison of the Weight Percent of Phosphorus Adsorbed onto Washed and As Prepared Gamma Alumina as a Function of Phenylphosphonic Acid Concentration

FIG. 5

Comparison of the Weight Percent of Phosphorus Adsorbed onto Washed and As Prepared Gamma Alumina as a Function of Aging Time

FIG. 6 pH of the 24-Hour Bayerite and Gamma Alumina Time Study as a Function of Aging Time

RP ALUMINA -- CHROMATOGRAPHIC TESTS AT ELEVATED pH

MIX: p-NITROANILINE - 1
METHYL BENZOATE - 2
PHENETOLE - 3
o-XYLENE - 4

FIG. 9a
2 HRS at pH = 10
N = 26,000

FIG. 9b
48 HRS at pH = 10
N = 19,000

FIG. 9c
+48 HRS at pH = 12
N = 25,000

LONG-TERM STABILITY TO ALL TYPES OF HPLC SOLVENTS
EXCELLENT STABILITY TO pH=10 & =12 BUFFERS
(+48 & +12 HRS)
MINIMAL TAILING OF POLAR, BASIC COMPOUNDS (eg. ANILINE)
10 μm PARTICLE SIZE COLUMNS SHOW HIGH EFFICIENCY
(N > 25,000)

CHROMATOGRAPHIC PACKINGS COMPRISING METAL OXIDE/HYDROXIDE REACTED WITH PHOSPHONIC ACID

BACKGROUND OF THE INVENTION

1. Field of the Invention

This invention relates to bonded, e.g., affinity or reverse phase chromatography column packing material. More particularly, this invention relates to such a packing material comprising a metal oxide/hydroxide reacted with phosphonic acid to form a monomolecular layer thereon thereby providing a reverse phase chromatographic packing material having good pH stability as well as high efficiency.

2. Description of the Related Art

Chromatographic packing materials made from organic resins suffer from poor physical strength, poor thermal stability, high cost, solvent swelling, and low capacity. Chromatographic packing materials made from metal oxides such as silica exhibit poor chemical stability at high pH. For many applications, in particular for reverse phase chromatography, a chromatographic packing material with high physical integrity, good chemical stability over high and low pH conditions, specific surface functionalities, good thermal stability, and low cost is needed.

Other metal oxides such as alumina have been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrades rapidly.

Modifications of metal oxide adsorbents such as alumina and aluminosilicates have been proposed. Stockel U.S. Pat. No. 4,506,628 teaches the formation of an adsorbent animal litter utilizing alumina, aluminosilicates, or coal residues as the substrate intimately mixed with monomers containing acid functionalities which polymerize in situ. The monomer, such as vinyl phosphonic acid, together with a redox catalyst, is mixed with a pliable dough formed from alumina and water and extruded into pellets which harden as the monomer polymerizes.

Modified alumina has also been used in the formation of catalysts. Johnson et al U.S. Pat. Nos. 4,202,798 and 4,251,350 describe the formation of a hydrocarbon hydrotreating catalyst formed by contacting alumina with a phosphorus-containing acid compound such as phenylphosphonic acid and then calcining the phosphorus-containing hydrous alumina. The calcined alumina is then treated with at least one metal-containing compound and again calcined to form the catalyst product.

In addition, Cupery U.S. Pat. No. 3,013,904 discloses a substrate having an organic polymer containing pentavalent phosphorous bonded thereto. Coatings of phosphorous-containing organic polymers are applied over coatings of positively charged colloidal metal oxides applied to negatively charged substrates. The thickness of the combined colloidal oxide and polymer layers on a substrate is less than 100 millimicrons.

Venables et al U.S. Pat. No. 4,308,079 teaches the treatment of an aluminum oxide surface of an aluminum substrate with a monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

SUMMARY OF THE INVENTION

A chromatographic packing material is provided comprising a metal oxide/hydroxide particle having chemically bonded to reactive sites on the surface thereof a monomolecular layer of one or more phosphonic acids with the non-polar portion of the molecule oriented away from the surface of the metal oxide/hydroxide particle for interaction with organic materials being passed through the chromatography column.

It is, therefore, an object of this invention to provide a chromatographic packing material comprising a monomolecular layer of one or more phosphonic acids bonded to the surface of a metal oxide/hydroxide particle.

It is another object of this invention to provide a chromatographic packing material comprising a monomolecular layer of one or more phosphonic acids bonded to the surface of a metal oxide/hydroxide particle which is stable at extended pH ranges yet capable of high efficiency in separation of materials.

It is yet another object of this invention to provide a process for making such a chromatographic packing material.

These and other objects of this invention will be obvious from the following description and accompanying drawings.

DETAILED DESCRIPTION OF THE INVENTION

In accordance with the invention, the chromatographic packing material comprises a metal oxide/hydroxide particle having chemically bonded thereto a substantially monomolecular layer of one or more phosphonic acids.

The use of the term "metal oxide/hydroxides" herein is intended to define a broad spectrum of oxides ranging from those which may contain few hydroxides, e.g., activated forms of aluminum oxide (alumina) to more hydrated forms which may comprise mainly hydroxide, e.g., Al(OH)$_3$. It has been found, however, that the metal hydroxide form, rather than the metal oxide form, provides a better bond with the phosphorous-containing group on the organic molecule with which it is reacted. However, for certain applications, dehydrated or activated forms of the metal oxide/hydroxide may be preferred due to the higher surface area of such particles. For example, when an aluminum oxide/hydroxide is used, the hydrated form will be preferred, e.g., gibbsite, bayerite, or boehmite will be preferred when a large external surface is desired and activated alumina will be preferred when it is desirous that the metal oxide/hydroxide have a large internal area.

By reverse phase chromatography is meant that the adsorbent is less polar than the eluding solvent, and in normal phase chromatography the adsorbent is more polar than the eluding solvent. That is, in reverse phase chromatography, the more non-polar sample components interact more with the relatively non-polar column packing and thus elute later than polar sample components. Typical mobile phases for reverse phase chromatography are aqueous buffers, water, methanol, acetonitrile, tetrahydrofuran, and mixtures of water or buffer with these organic solvents.

As presently understood, the metal oxide/hydroxides suitable for use in the present invention usually require hydroxyl groups on the surface thereof for purposes of providing bonding sites for the phosphorous-containing phosphonic acids. For example, when the particulate material is alumina, hydroxyl groups on the surface of the alumina react with the phosphorous-containing group of the phosphonic acid molecule, i.e., with the -POOH acid group of the phosphonic acid. When using an organic solvent, particularly where the solvent is immiscible with water, a monolayer of hydroxyl groups are provided on the alumina particles for purposes of reacting to form a chemical bond with the phosphonic acid groups. It will be appreciated that if more than a monolayer of hydroxyl units are present on the alumina surface, such as hydroxyl units present as a result of water, this additional water layer can act to hinder the reaction. Thus, while it is preferred to have a maximum of a monolayer of hydroxyl units, less than a complete surface layer of hydroxyl units can be present on the metal oxide and such does not hinder reactivity.

Metal oxide/hydroxides which may be used as the support particle for reaction with the phosphonic acids include any metal capable of forming an oxide/hydroxide selected from the class consisting of group IB, group IIA, group IIB, group IIIA, group IIIB, group IVA, group IVB, group VA, group VB, group VIB, group VIIB, and group VIII metals, or combinations thereof. In addition, oxides/hydroxides of the lanthanide series, as well as oxides/hydroxides of thorium and uranium in the actinide series, may be used as the support particle.

For example, the oxide/hydroxides of aluminum, magnesium, titanium, zirconium, iron, silicon, chromium, zinc, vanadium, and combinations of these may be used. Also, a core or center of iron oxide/hydroxide or other paramagnetic or diamagnetic material may be used with a coating of a metal compound to take advantage of the magnetic properties of of the iron oxide/hydroxide as an adsorbent. It should be noted that by use of the term "metal", it is intended to include not only the traditional metals, but also materials sometimes referred to as metalloids such as Si, Se, B, As, and Te and to exclude the remaining elements referred to as nonmetals in the periodic table. In addition, oxides/hydroxides of the lanthanide series as well as oxides/hydroxides of thorium and uranium in the actinide series may be used as the support particle.

To produce the chromatographic packing material comprising the metal oxide/hydroxide reacted with one or more phosphonic acids, the metal oxide/hydroxide, such as alumina, may be reacted with a phosphonic acid in an aqueous media at a temperature of from about 25° C. up to about 90° C., preferably about 25° C., for a period of from at least 0.1 to not more than 20 hours, and preferably from at least about 0.5 hours up to about 4 hours, using an initial acid concentration of at least about 0.0001 molar up to about 0.1 molar. In some instances, higher concentrations may be desirable. When the media is nonaqueous, the temperature range can be greatly extended. For example, it may range from 5° C. or lower up to 200° C. or sometimes higher depending upon the particular liquid media.

For purposes of ensuring that a monolayer of phosphonic acid is bonded to the metal oxide particles, the application should be carefully controlled. That is, a monolayer can be obtained, for example, by controlling the viscosity of the media, the time of exposure in the media, the concentration of phosphorous-bonding hydroxyl units in the media, or the concentration of hydroxyl units on the metal oxide particles.

The reverse phase chromatographic packing material used as a column packing material for reverse phase chromatography, comprises a metal oxide/hydroxide, preferably aluminum oxide/hydroxide, having a particle size range of from about 0.5–300 microns, preferably about 1–80 microns with a pore diameter size of from 20–100,000 Angstroms, preferably about 40–1000 Angstroms, with a pore volume of about 0.1–2 milliliters/gram, preferably about 0.3–1.5 milliliters/gram, e.g., 0.3 to 0.8 milliliters/gram.

The reverse phase chromatographic packing material further comprises from 1–75 wt. % (calculated on total weight of the packing material), preferably 4–50 wt. %, and typically 5–20 wt. % of one or more phosphonic acids bonded as a monomolecular layer to the reactive sites on the surface of the aluminum oxide/hydroxide support material. The phosphonic acids bonded to the support material preferably comprise a mixture of from 2 to 97 wt. %, preferably 25–95 wt. %, (based on total weight of phosphonic acids) of one or more phosphonic acids having the formula RPO(OH)$_2$ wherein R is a 5–30 carbon saturated or unsaturated aliphatic hydrocarbon or aromatic hydrocarbon and from 5–75 wt. % of one or more phosphonic acids having the formula R'PO(OH)$_2$ wherein R' is a 1–4 carbon saturated or unsaturated aliphatic hydrocarbon.

Preferably R' is a single carbon radical, i.e., methyl phosphonic acid which is reacted with the aluminum oxide/hydroxide surface after treatment with the longer chain phosphonic acid to react with any remaining hydroxyl groups on the aluminum oxide/hydroxide surface to provide good peak symmetry for the materials being passed through the column for analysis.

It will be noted that the R group is always a monomer or oligomer. Preferably, the oligomer has a molecular weight of less than 2000. By the use of monomer herein is meant to include a chemical compound that can undergo polymerization. By oligomer is meant a polymer or polymer intermediate containing relatively few structural units, i.e., a polymer containing 2–4 monomers.

While we do not wish to be bound by any particular theory of bonding, it is believed that when a metal oxide/hydroxide particle, for example, alumina, is brought into contact with the phosphonic acid (containing either the long chain or the short chain carbon group previously discussed) a reaction or adsorption of the acid on the alumina takes place in which the aluminum and phosphorous atoms in the respective molecules are apparently bonded together through an oxygen atom as illustrated in the formulas below (in which formula R may represent, for purposes of illustrating the reaction, either the long chain R group or the short chain R' group previously discussed):

Phosphonic + Hydrated ⟶ Product + Water
Acid        Alumina

Thus it can be seen, using the above proposed model, that if all of the exposed hydroxyl groups on the surface of the alumina can be reacted with the phosphonic acid groups, the surface chemistry of the reacted alumina will be changed. For example, when an alumina treated with a phosphonic acid having a octadecyl R group is used, for example, p-nitroaniline, methyl benzoate, phenetole, and o-xylene under chromatographic conditions can be selectively adsorbed on such a chromatographic packing material in accordance with the present invention.

Figure 8:
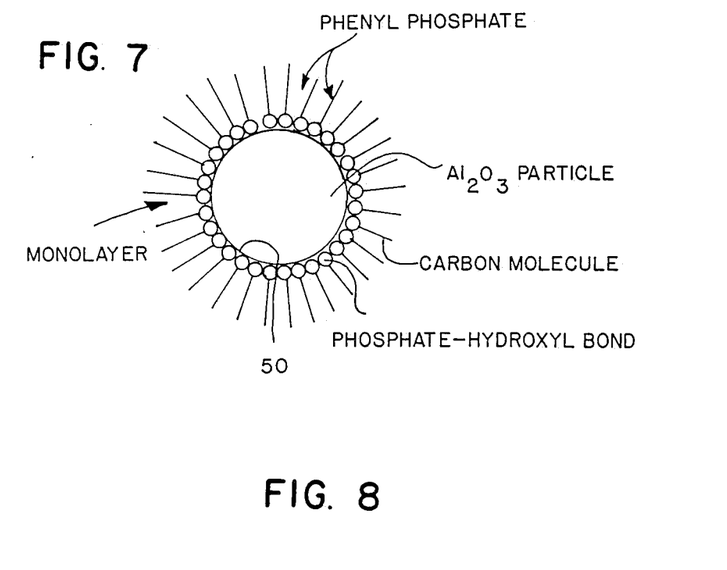
FIG. 8 is an illustration of a metal oxide/hydroxide particle having a monolayer of phosphorous-containing material thereon.

The chemical bonding of the phosphonic acid to the metal oxide/hydroxide particle, e.g. alumina particle, is illustrated in FIG. 8 wherein the center represents the alumina particle having a surface 50. The carbon-containing molecule is chemically bonded at one end to surface 50 by means of a phosphorous-oxygen-metal bond. As presently understood, it is preferred that the other or free end of the carbon containing molecule extends away from the surface of the particle, as shown in FIG. 8. Further, it is important to control the application or bonding of the phosphonic acid to the metal oxide/hydroxide support so as to obtain a monolayer bonded to the metal oxide/hydroxide particle as illustrated in FIG. 8.

By "monolayer" is meant that 90%, and preferably 98%, of the phosphonic acid molecules are bonded to the metal oxide/hydroxide particle as a monolayer. Thus, the application should be controlled so as to prevent the R or R' groups from bonding to each other to form weakly adsorbed multilayers which would then provide further hydroxyl units, i.e., —POOH units directed away from and not bonded to the metal oxide/hydroxide particles, thereby defeating the purpose of the invention. The thickness of the phosphorous-containing bonded organic monolayer is in the range of 10–5000 Angstroms and preferably 20 to 500 Angstroms.

As noted earlier, while it is desired to avoid organic polymers where the chain has repeating phosphorous-containing groups which can bond to the metal oxide particle surface, oligomers having preferably a single phosphorous-containing group may be used when the group is located at the terminal position. The single phosphorous-bonding group permits the oligomer to have a free end which extends away from the metal oxide particle surface. Additionally, the monomer or oligomer comprising the monolayer may have reactive sites which can permit crosslinking so as to polymerize monomers or oligomers already bonded to the surface of the metal oxide particle.

The available surface area, both outside and inside of the pores, will be somewhat dependent upon the relationship between the pore size of the aluminum oxide/hydroxide support material and the length of the R group on the phosphonic acid. If the pore size is small with respect to the size of the R group on the phosphonic acid molecule, the phosphonic acid may or may not be able to enter into the pores, thereby changing the effective area available for interaction with the organic material being passed through the chromatographic column.

Because of the pores and fissures that can be present on the metal oxide particle, particularly those having high surface area, often all the surface hydroxyl units are not reacted because of the inability of the longer chain phosphorous-containing organic material reaching or diffusing into the pores and fissures. Thus, to inert or block remaining reactive sites, the R'PO(OH)$_2$ phosphonic acid containing the short-chain monomer or oligomer, e.g., 1–4 carbon atoms per chain, is used in a second treatment or reaction. In this way, all of the reactive sites are capped or blocked. That is, for capping off the reactive sites, short-chain monomers can be used. For example, an alumina treated with a high molecular weight phosphonic acid corresponding to the RPO(OH)$_2$ formula, e.g. an n-heptadecylphosphonic acid, may be further treated with a low molecular weight phosphonic acid, e.g., methylphosphonic acid, to treat any remaining unreacted alumina surface areas.

It should be noted in this regard that it is the long chain hydrocarbon R groups, not the short chain R' groups, which principally interact with the respective organic materials being passed though the column to provide the independent peaks identifying the particular organic material passing through the column at various rates of elution. The principal function of the shorter chain R' groups is to react with any remaining hydroxyl groups on the aluminum oxide/hydroxide support material so that the non-polar group or groups of the organic material passing through the column will interact with the non-polar packing material (rather than the polarized end of the organic molecule passing through the column interacting with exposed hydroxyl groups on the support material) so that a true reverse phase profile through the chromatographic column is maintained. Thus, the shorter chain phosphonic acid must be reacted with the support surface in an amount sufficient to bond to all reactive hydroxyl sites remaining on the support surface after the initial treatment with the one or more longer chain phosphonic acids.

After formation of the packing material, the material may be treated in an organic solvent or a basic or acidic solution, or a combination thereof, e.g., a $NaHCO_3$/$Na_2CO_3$ washing solution having a pH of about 10, to remove any weakly adsorbed molecules on the particles. This ensures that all of the molecules remaining are bonded to the hydroxyl groups on the metal oxide/hydroxide surface and not to one another, thus assuring formation of the desired monomolecular layer stable over a wide range of pH.

The resulting reverse phase chromatographic packing material is stable at pH ranges of from 1-14 and has good stability in the range of 2-12 while still maintaining high efficiency of separation. Typically, a reverse phase packing based on approximately 10 micron diameter alumina particles with an initial surface area of 150 $m^2$/gram will result in a chromatographic support with an N number of 18,000 to as high as over 25,000 per meter (N being the number of theoretical plates).

The following examples will serve to better illustrate the invention.

Example I

High purity bayerite and gamma alumina were used as supports. The nitrogen BET surface area was 19 and 65 $m^2$/g for bayerite and gamma, respectively. Both the bayerite and gamma aluminas, having an average particle size of about 2 microns, were dried in a 110° C. drying oven and 10 gram samples were weighed into a number of glass sample vials. To each of four vials containing 10 gram samples of gamma alumina was added, respectively, 100 ml of 0.1, 0.01, 0.001, and 0.0001 molar solutions of phenylphosphonic acid formed by diluting a 0.1 molar phenylphosphonic acid solution with deionized and distilled water. Molar concentrations of 0.01, 0.001 and 0.0001 gave a monolayer but cover less than all of the surface area available on the particles. A molar concentration of 0.1 was sufficient to provide a monolayer on most of the surface area of the particles. Higher than 0.1 molar would have resulted in multilayering, which is undesirable. To a fifth 10 gram sample of gamma alumina was added 100 ml of deionized and distilled water. Five more samples were similarly prepared using 10 gram bayerite samples instead of gamma alumina. The ten samples were shaken and then allowed to age for 24 hours. The contents of the sample containers were then vacuum filtered through Whatman 42 filter paper. The surface modified alumina samples were placed in clean vials and dried in a 110C drying oven. The phosphorus content of each of the samples was determined by direct current plasma.

Figure 1:
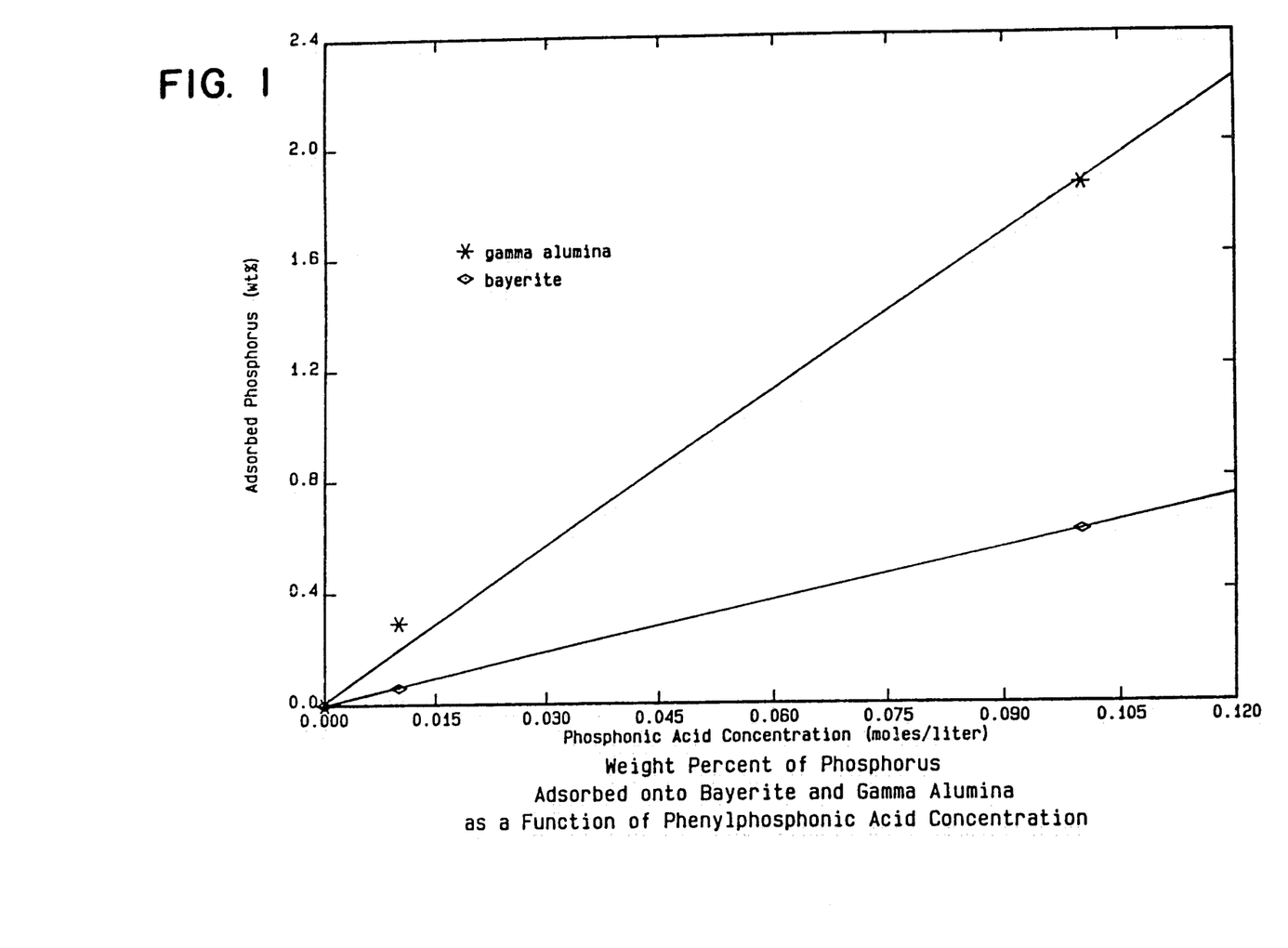
FIG. 1 is a graph showing the weight percent of phosphorous adsorbed to forms of aluminum oxide/hydroxide as a function of acid concentration.

The results are tabulated in Table 1 and plotted in the graph of FIG. 1. It can be seen that there is a significant increase in the amount of phosphorus present on the surface of the bayerite and gamma alumina samples aged in the 0.1 molar solution of phenyl-phosphonic acid compared to less concentrated amounts. Higher phosphorus content of gamma alumina compared to bayerite is because of its higher surface area.

TABLE 1

| Sample Number | Alumina Form | Acid Conc. (M) Molar | Adsorbed Phosphorus Wt. % |
| --- | --- | --- | --- |
| 1 | bayerite | 0.0000 | 0.00 |

TABLE 1-continued

| Sample Number | Alumina Form | Acid Conc. (M) Molar | Adsorbed Phosphorus Wt. % |
| --- | --- | --- | --- |
| 2 | bayerite | 0.0001 | 0.01 |
| 3 | bayerite | 0.001 | 0.01 |
| 4 | bayerite | 0.01 | 0.06 |
| 5 | bayerite | 0.1 | 0.61 |
| 6 | gamma | 0.0000 | 0.00 |
| 7 | gamma | 0.0001 | 0.01 |
| 8 | gamma | 0.001 | 0.04 |
| 9 | gamma | 0.01 | 0.29 |
| 10 | gamma | 0.1 | 1.85 |

EXAMPLE II

Figure 6:
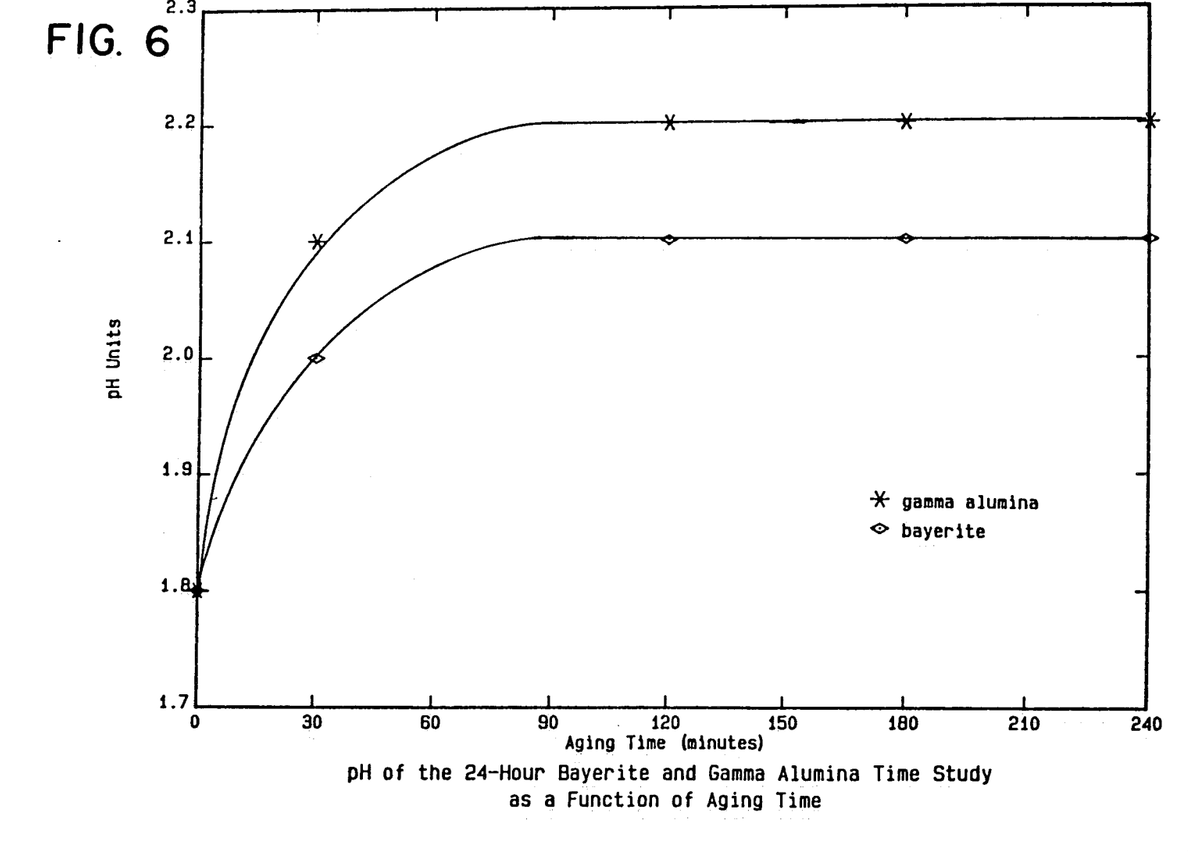
FIG. 6 is a graph of the pH of the solution plotted against time as an indication of phosphorous adsorption on aluminum oxide/hydroxide particles.
Figure 7:
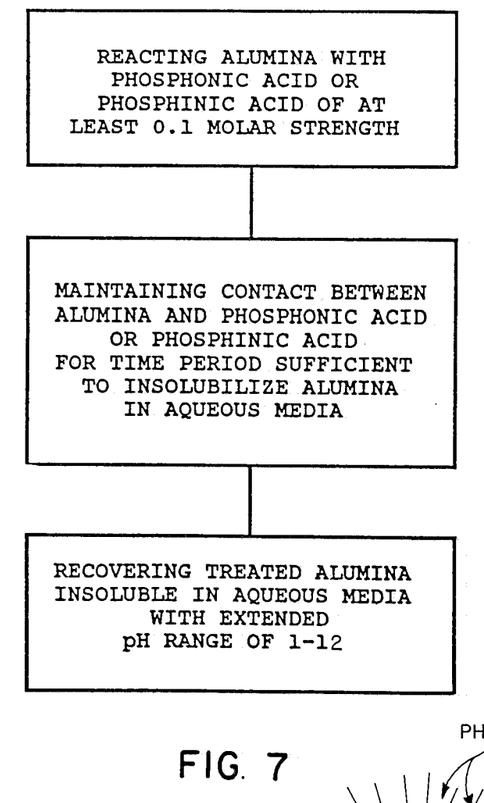
FIG. 7 is a flowsheet illustrating the invention.

Another group of 10 gram samples of gamma and bayerite aluminas were used and to each sample was added 100 ml of 0.1 molar phenylphosphonic acid. Each sample vial was covered and shaken and then allowed to age for a predetermined time period followed by, filtration, drying, and measurement similar to that previously described in Example 1 to determine the phosphorus content on the alumina sample with respect to contact time between the respective alumina samples and the phenylphosphonic acid. These results are tabulated in Table 2 and illustrated in the graph of FIG. 2. The filtrate for the alumina samples aged for various time periods was also analyzed for phosphorus content. The concentration of phosphorus in the filtrate of the bayerite and gamma alumina samples aged for various amounts of time is plotted in FIG. 3. The pH change of the respective solution for the gamma and bayerite samples aged for 24 hours was also monitored and the change in pH with respect to time was plotted in FIG. 6 to illustrate yet another way of monitoring the amount of chemically adsorbed phenylphosphonic acid on the aluminas. It is seen that the solution containing the gamma alumina sample shows a rapid rise in pH between 0 and 30 minutes and then a slow increase until 120 minutes where it begins to decrease slightly. The pH of the solution containing the bayerite alumina sample shows linear increase from 0 to approximately 150 minutes and then decreases slightly. It should be noted that aluminas other than bayerite and gamma alumina, e.g., gibbsite, boehmite, eta, chi, rho, delta, kappa and alpha, may be used as supports.

TABLE 2

| Sample Number | Alumina Type | Time in Minutes | Phosphorus Wt. % |
| --- | --- | --- | --- |
| 1 | bayerite | 2 | 0.12 |
| 2 | bayerite | 4 | 0.11 |
| 3 | bayerite | 8 | 0.12 |
| 4 | bayerite | 16 | 0.12 |
| 5 | bayerite | 32 | 0.11 |
| 6 | bayerite | 64 | 0.13 |
| 7 | bayerite | 128 | 0.12 |
| 8 | bayerite | 256 | 0.38 |
| 9 | bayerite | 1440 | 1.31 |
| 10 | gamma | 2 | 0.72 |
| 11 | gamma | 4 | 0.62 |
| 12 | gamma | 8 | 0.65 |
| 13 | gamma | 16 | 0.67 |
| 14 | gamma | 32 | 0.62 |
| 15 | gamma | 64 | 0.63 |
| 16 | gamma | 128 | 0.65 |
| 17 | gamma | 256 | 0.80 |
| 18 | gamma | 1440 | 1.56 |

EXAMPLE III

To further illustrate the practice of the invention, 3 grams each of the filtered and dried gamma alumina samples from Example I, respectively contacted with 0.1, 0.01 and 0.0001 molar phenylphosphonic acid, were washed and filtered 3 times with 30 ml of distilled, deionized water. Filtered and dried 3 gram gamma alumina samples from Example II which had, respectively, been contacted with 0.1 molar phenylphosphonic acid for 8, 64, and 1440 minutes were similarly washed. All the washed samples were then placed into clean vials and dried in a 110° C. drying oven. The gamma alumina samples contacted with the 0.1 molar concentration phenylphosphonic acid were not wettable. They were also not affected by the washing.

Figure 2:
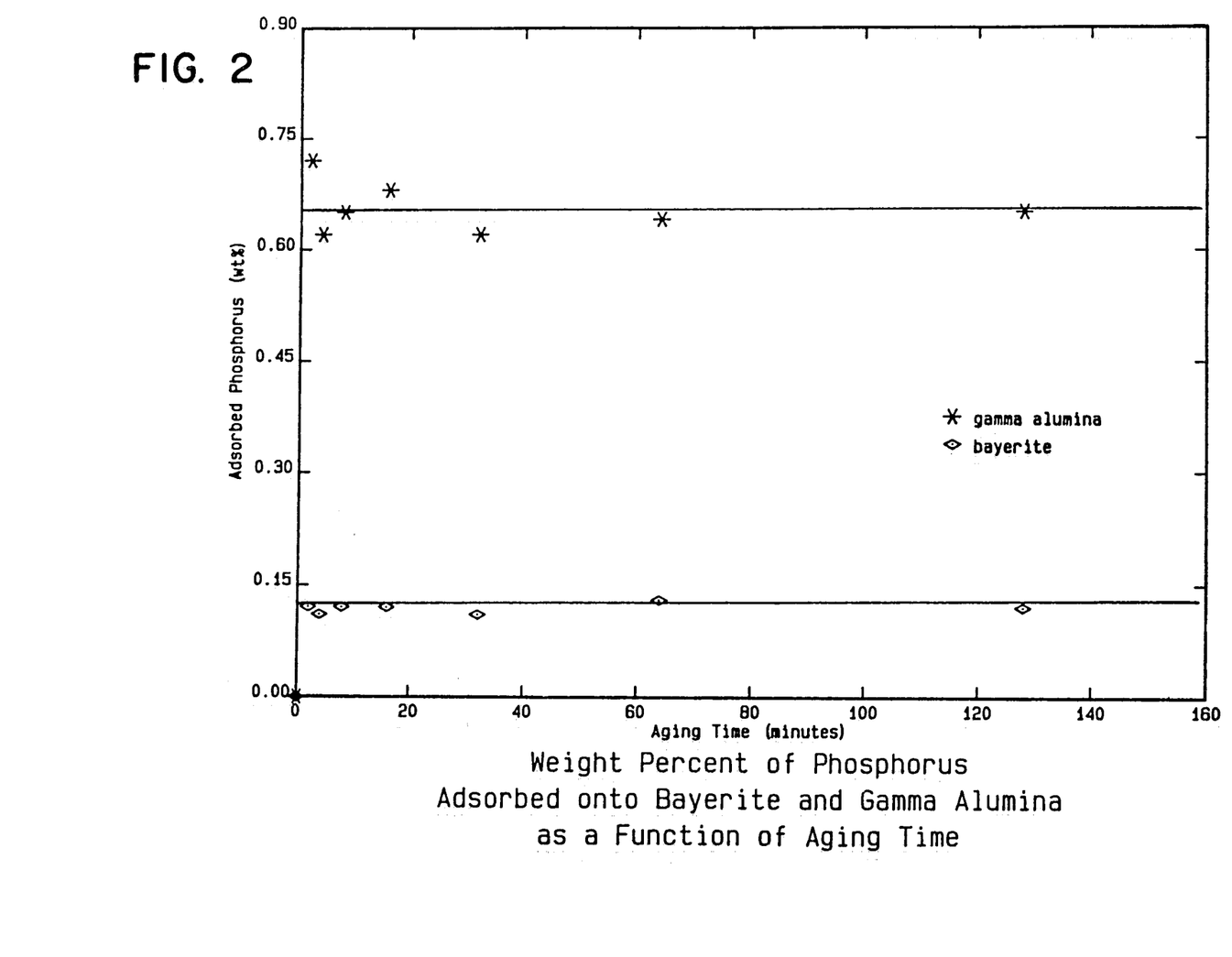
FIG. 2 is a graph showing the weight percent of phosphorous adsorbed to forms of aluminum oxide/hydroxide as a function of aging time.
Figure 3:
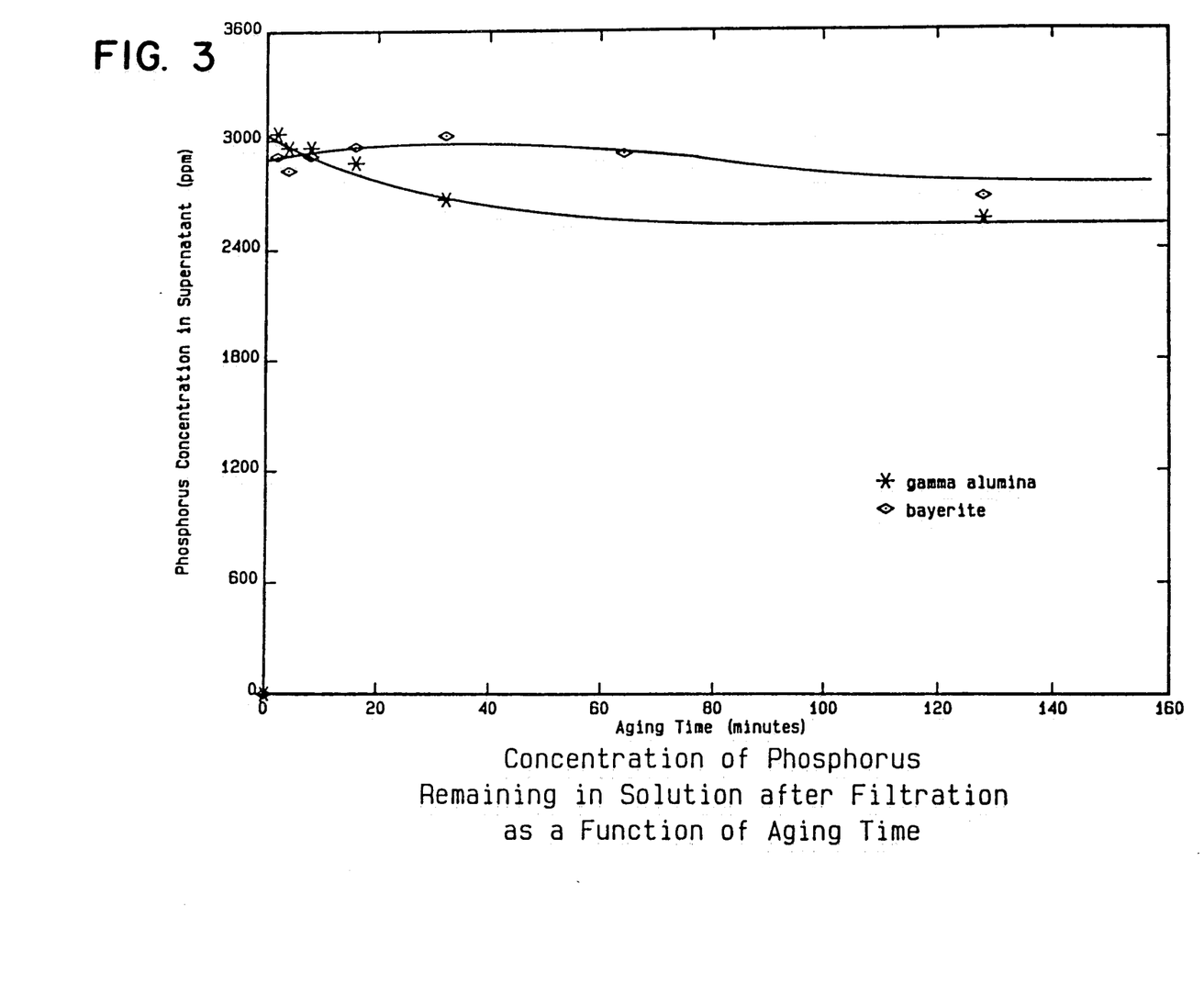
FIG. 3 is a graph showing the concentration of phosphorous remaining in solution after filtration as a function of aging time.
Figure 4:
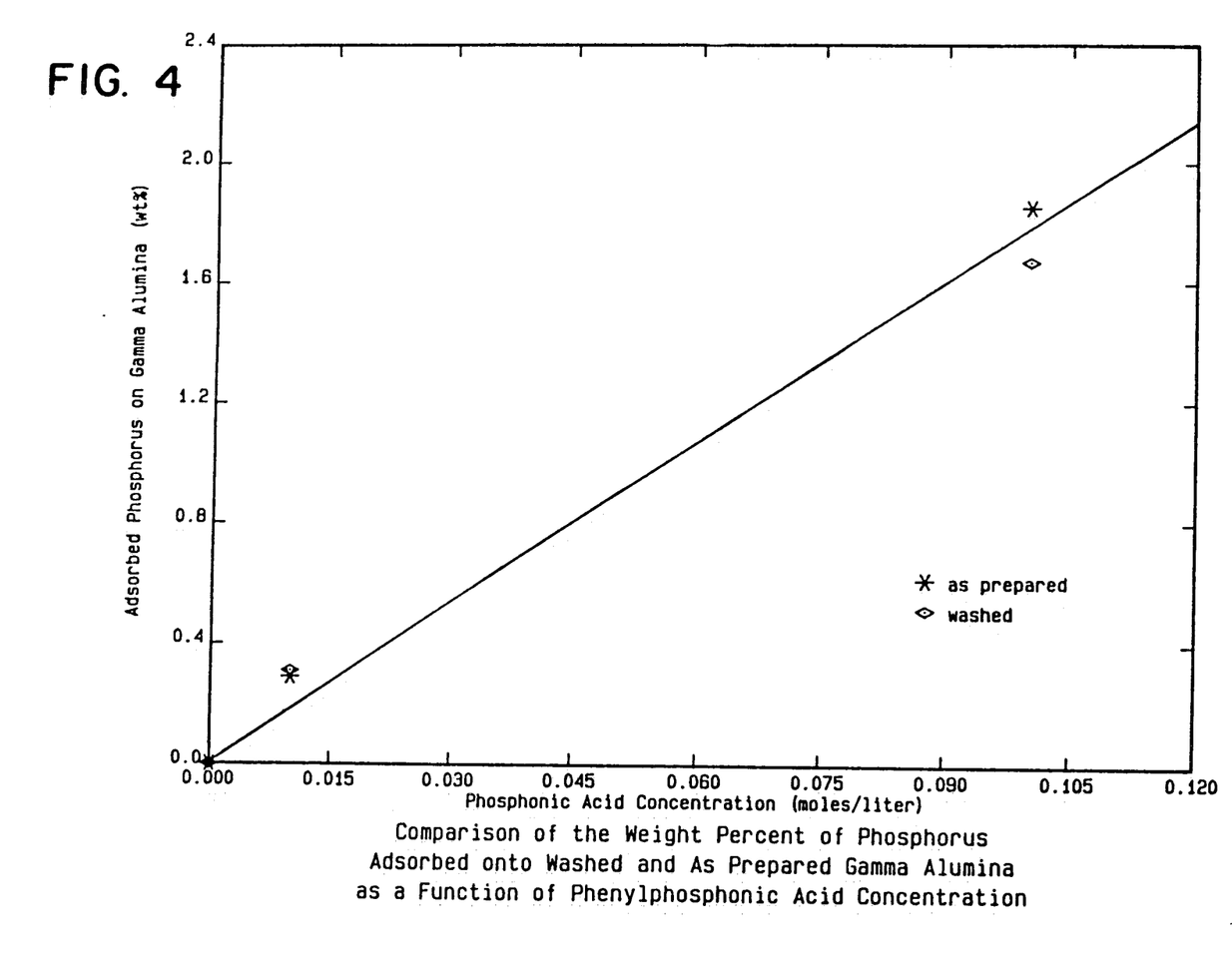
FIG. 4 is a graph showing the weight percent of phosphorous adsorbed to gamma alumina before and after washing as a function of acid concentration.
Figure 5:
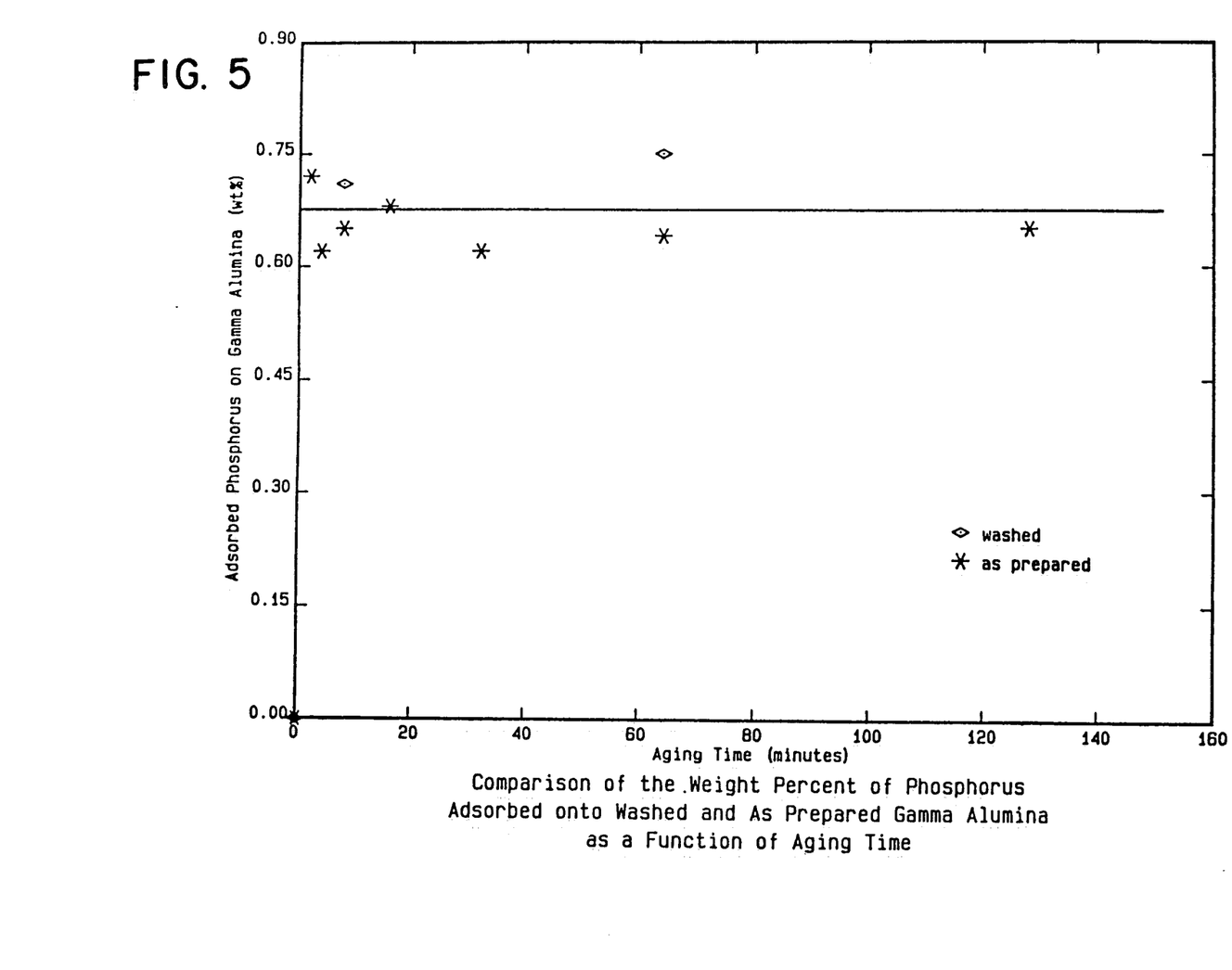
FIG. 5 is a graph showing the weight percent of phosphorous adsorbed to gamma alumina before and after washing as a function of aging time.

The results are respectively illustrated in FIGS. 4 and 5 in which the results from the washed samples are plotted in dotted lines superimposed on the respective solid line gamma curves for unwashed samples corresponding to the gamma curves respectively shown in FIGS. 1 and 2. It will be noted that the amount of phosphorus remaining on the treated alumina after washing is fairly comparable to the unwashed samples.

EXAMPLE IV

To illustrate the multiple treatment of alumina with more than one type of phosphonic or phosphinic acid, a solution of 0.1 molar n-heptadecylphosphonic acid was prepared by dissolving 3.8454 grams in 120 ml. of isopropanol at 45° C. Thirty grams of activated 7-12 micron alumina was weighed into this solution which was then shaken to mix and placed in an ultrasonic bath for 15 minutes. The mixture was vacuum filtered through Whatman #3 filter paper. The alumina was washed with 3 volumes of isopropanol and placed in an oven at 110° C. to dry. The unreacted sites on the surface of the alumina were then capped with methylphosphonic acid. A solution of 0.1 molar methyl phosphonic acid was prepared by dissolving 1.1524 grams of methylphosphonic acid in 120 ml. of isopropanol at 45° C. The dried, n-heptadecylphosphonic acid loaded alumina was added to this, shaken to mix, and placed in an ultrasonic bath for 15 minutes. The alumina was then again filtered, washed and dried at 110° C.

Another alumina sample was then contacted with a 0.3 molar solution of n-heptadecylphosphonic acid dissolved in isopropanol under the same conditions and then capped as above with a 0.1 molar solution of methylphosphonic acid.

Both samples were analyzed on an IBM Instruments IR-98 Fourier Transform Infrared Spectrometer with 128 scans per spectrum at 4 cm-1 resolution. The spectra were plotted using a KBr spectrum as reference. The bands chosen for the n-heptadecylphosphonic acid calibration curves were the 2928 cm-1 asymmetric stretching band and the 1470 cm-1 bending band. The band at 1470 cm-1 is selected as the analytical wavelength because the value for its standard deviation is ten times less than the value for the band at 2928 cm-1. At this wavelength, the respective weight percent of n-heptadecylphosphonic acid loaded by treating the alumina with the 0.1 molar and 0.3 molar solutions was 6.88 and 24.85 wt. %, respectively.

EXAMPLE V

A reverse phase chromatographic packing material was prepared in accordance with the invention by reacting an aluminum oxide/hydroxide support material with a 0.1 molar long chain phosphonic acid at a temperature of 120° C. for 1 hour. The support material was then reacted at 120° C. with a 0.1 molar methyl phosphonic acid for 1 hour to cap off any remaining reactive hydroxyl sites on the support material. The support material comprised an aluminum oxide/hydroxide having a particle size range of about 7-12 microns, a pore diameter range of from about 20 to 100 Angstroms, and a pore volume of from about 0.2 to 1.0 milliliters/gram. The long chain phosphonic acid comprised octadecyl acid and the weight ratio of the two phosphonic acids was 7 wt. % octadecyl acid and 4 wt. % methyl phosphonic acid with a weight ratio of total phosphonic acids to aluminum oxide/hydroxide support of 11 wt. %. About 5 grams of this reverse phase chromatographic packing material was packed into a 4.6 millimeter I.D. column to a height of 25 cm to provide a total volume of approximately 4 to 5 ml.

Figure 9A:
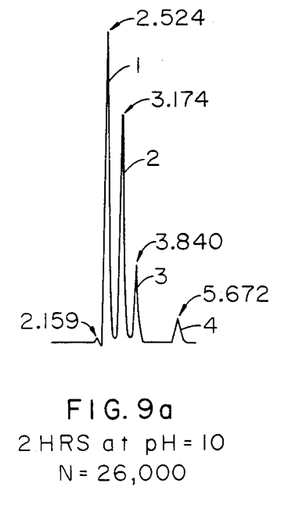
FIGS. 9A–9C are plots of chromatographic tests run on columns containing the packing material of the invention.
Figure 9B:
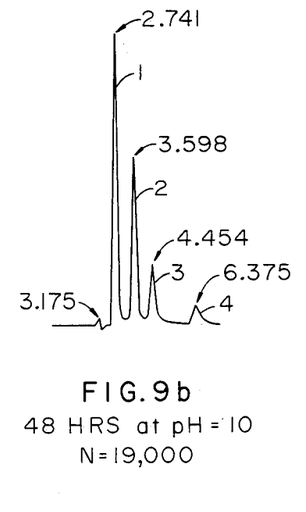
Figure 9C:
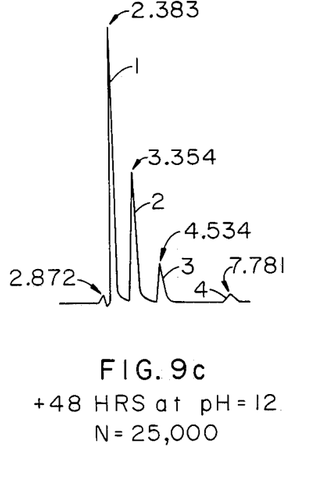

A test mixture consisting of 0.2 grams of p-nitroaniline, 0.2 grams of methyl benzoate, 0.2 grams of phenetole and 0.2 grams of o-xylene dissolved in 1000 ml of methanol was prepared. The test mixture was injected at various times onto the column, and the components of the mixture were eluted from the column with a solvent system of 40% water, 30% methanol and 30% acetonitrile at a flow rate of 1.25 ml/min. The pH of the water portion of the solvent system was raised to pH 10 with a sodium carbonate/sodium hydroxide buffer and after running for 2 hours, the efficiency was N=19,000 showing the packing material retained its stability and high efficiency for an extended period of usage. The same solvent system, with the pH readjusted to 12 through the addition of additional sodium hydroxide, was passed through the same column for an additional 48 hours, and the efficiency measured at N=25,000 which further indicated the high efficiency and good stability of the material at high pH. The chromatographic measurements showing the sharp peaks for the four materials respectively at 2 hours and 48 hours at ph 10 and over 48 hours at pH of 12 are shown respectively in FIGS. 9A-9C.

Thus the invention provides an improved reverse phase chromatographic packing material which exhibits good stability over a wide pH range with good separation efficiency.

Having thus described the invention, what is claimed is:

1. A chromatographic packing material comprising a monomolecular layer of one or more phosphonic acids chemically bonded to substantially all of the exposed hydroxyl groups on the surface of a particulate metal oxide/hydroxide support material having a particle size range of from about 0.5 to 300 microns; a pore diameter range of from about 20 to about 10,000 Angstroms; and a pore volume of from about 0.1 to about 2 milliliters/gram.

2. A chromatographic packing material comprising a monomolecular layer of a mixture of phosphonic acids bonded to a particulate metal oxide/hydroxide support material wherein:
   (a) said mixture of phosphonic acids bonded to said support material comprises from about 1 to about 75 wt. % of the total weight of said packing material and said mixture further comprises:
       (i) from about 2 to about 97% of one or more phosphonic acids having the formula $RPO(OH)_2$ wherein R is a 5-30 carbon saturated or unsaturated aliphatic hydrocarbon or an aromatic hydrocarbon; and (ii) from about 5 to about 75% of one or more phosphonic acids having the formula R'PO(OH)$_2$ wherein R' is a 1-4 carbon saturated or unsaturated aliphatic hydrocarbon; and (b) said particulate support material is further characterized by a particle size range of from about 0.5 to about 300 microns, a pore diameter range of from about 20 to about 100,000 Angstroms, and a pore volume of from about 0.1 to about 2 milliliters/gram.

3. The chromatographic packing material of claim 2 wherein said metal oxide/hydroxide comprises aluminum oxide/hydroxide.

4. The chromatographic packing material of claim 2 wherein said particulate metal oxide/hydroxide support material has a particle size range of from about 1 to about 80 microns.

5. The chromatographic packing material of claim 2 wherein said particulate metal oxide/hydroxide support material has a pore diameter range of from about 40 to about 1000 Angstroms.

6. The chromatographic packing material of claim 2 wherein said particulate metal oxide/hydroxide support material has a pore volume of from about 0.3 to about 1.5 milliliters/gram.

7. The chromatographic packing material of claim 2 wherein said metal oxide/hydroxide particle comprises an oxide/hydroxide of an element capable of forming an oxide/hydroxide selected from the class consisting of group IB, group IIA, group IIB, group IIIA, group IIIB, group IVA, group IVB, group VA, group VB, group VIB, group VIIB, and group VIII metals; lanthanide series: silicon, thorium, boron, uranium, selenium, arsenic and tellurium.

8. The active material of claim 7 wherein said metal oxide/hydroxide comprises an oxide/hydroxide of a metal selected from the class consisting of aluminum, magnesium, titanium, zirconium, iron, silicon, chromium, zinc, vanadium, and combinations of these metals.

9. The chromatographic packing material of claim 2 wherein said phosphonic acid having the formula R'PO(OH)$_2$ consists essentially of methyl phosphonic acid which is reacted with hydroxyl groups on said support material after reaction between said support material and said one or more phosphonic acids having 5-30 carbons thereon in an amount sufficient to react with any remaining reactive hydroxyl sites on said support material.

10. A reverse phase chromatographic packing material comprising:

(a) a particulate aluminum oxide/hydroxide support material having a particle size range of from about 0.5 to about 300 microns, a pore diameter range of from about 20 to about 100,000 Angstroms, and a pore volume of from about 0.1 to about 2 milliliters/gram: and having chemically bonded thereto;

(b) a monomolecular layer of phosphonic acids comprising a mixture of:

(i) from about 25 to about 95% of one or more phosphonic acids having the formula RPO(OH)$_2$ wherein R is a 5-30 carbon saturated or unsaturated aliphatic hydrocarbon or an aromatic hydrocarbon; and (ii) from about 5 to about 75% of one or more phosphonic acids having the formula R'PO(OH)$_2$ wherein R' is a 1-4 carbon saturated or unsaturated aliphatic hydrocarbon;

whereby a reverse phase chromatographic packing material is formed characterized by good pH stability and high efficiency.

11. The reverse phase packing material of claim 10 wherein said monomolecular layer of said one or more phosphonic acids bonded to said particulate support material comprises from about 1 to about 75 wt. % of the total weight of said packing material.

12. The reverse phase packing material of claim 11 wherein said monomolecular layer of said one or more phosphonic acid bonded to said particulate support material comprises from about 4 to about 50 wt. % of the total weight of said packing material.

13. The reverse phase chromatographic packing material of claim 10 wherein said phosphonic acid having the formula R'PO(OH)$_2$ consists essentially of methyl phosphonic acid which is reacted with hydroxyl groups on said support material after reaction between said support material and said one or more phosphonic acids having 5-30 carbons thereon in an amount sufficient to react with any remaining reactive hydroxyl sites on said support material.

14. The reverse phase chromatographic packing material of claim 10 wherein said pore diameter is in a range of from about 40 to about 1000 Angstroms.

15. The reverse phase chromatographic column exhibiting good pH stability and high efficiency comprising a column filled with particulate packing material comprising a monomolecular layer of phosphonic acids comprising a mixture of:

(a) from about 25 to about 95% of one or more phosphonic acids having the formula RPO(OH)$_2$ wherein R is a 5-30 carbon saturated or unsaturated aliphatic hydrocarbon or an aromatic hydrocarbon; and (b) from about 5 to about 75% of one or more phosphonic acids having the formula R'PO(OH)2 wherein R' is a 1-4 carbon saturated or unsaturated aliphatic hydrocarbon; said phosphonic acids being bonded to a particulate aluminum oxide/hydroxide support material having a particle size range of from about 0.5 to about 300 microns, a pore diameter range of from about 20 to about 10,000 Angstroms, and a pore volume of from about 0.1 to about 2 milliliters/gram.

16. The reverse phase chromatographic packing material of claim 15 wherein said pore diameter is in a range of from about 40 to about 1000 Angstroms.

17. A method of making a chromatographic packing material characterized by good pH stability and high efficiency comprising:

(a) reacting with a particulate metal oxide/hydroxide support material, having a particle size range of from about 0.5 to about 300 microns, one or more phosphonic acids having the formula RPO(OH)$_2$ wherein R is a 5-30 carbon saturated or unsaturated aliphatic hydrocarbon or an aromatic hydrocarbon to form a monomolecular layer of said one or more phosphonic acids on the surface of said particulate support material; and (b) further reacting said particulate support material with one or more phosphonic acids having the formula R'PO(OH)$_2$ wherein R' is a 1-4 carbon saturated or unsaturated aliphatic hydrocarbon in a quantity sufficient to form chemical bonds with all remaining reactive hydroxyl sites on said support material.

18. The method of claim 17 which includes the further step of providing a particulate metal oxide/hydroxide support material having a pore diameter range of from about 20 to about 100,000 Angstroms, and a pore volume of from about 0.1 to about 2 milliliters/gram.

19. The method of making a chromatographic packing material of claim 18 wherein said pore diameter is in a range of from about 40 to about 1000 Angstroms.

20. The method of claim 17 wherein said step of further reacting said particulate support material with one or more phosphonic acids having the formula R'PO(OH)$_2$ comprises further reacting said particulate material with methylphosphonic acid.

21. The method of claim 17 wherein the concentration of said phosphonic acids is from about 0.0001 to about 0.1 molar.

22. The method of claim 17 wherein in each of said steps, said phosphonic acids are reacted with said support material in a non-aqueous media for a period of from about 0.1 to not more than about 20 hours at a temperature of from about 5° C. up to about 200° C. to form said monomolecular layer on said metal oxide/hydroxide support material.

23. The method of claim 17 wherein in each of said steps, said phosphonic acids are reacted with said support material for a period of from about 0.1 to not more than about 20 hours in an aqueous media at a temperature of from about 25° C. up to about 90° C. to form said monomolecular layer on said metal oxide/hydroxide support material.

* * * * *